Figure 6:
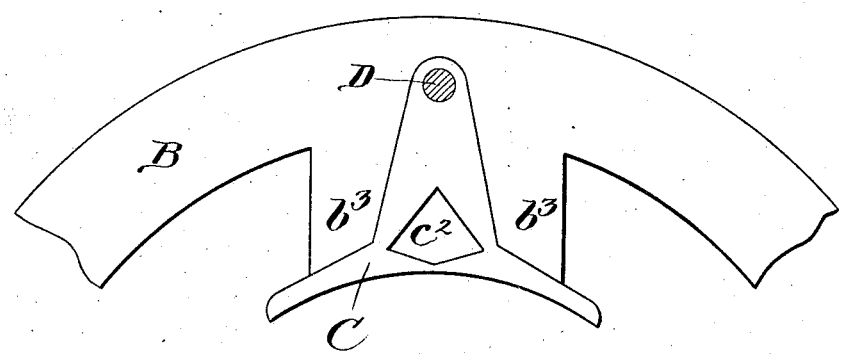

No. 893,711. PATENTED JULY 21, 1908.
A. L. CUSHMAN.
FIELD MAGNET FOR DYNAMO ELECTRIC MACHINES.
APPLICATION FILED MAY 8, 1905.
3 SHEETS—SHEET 1.
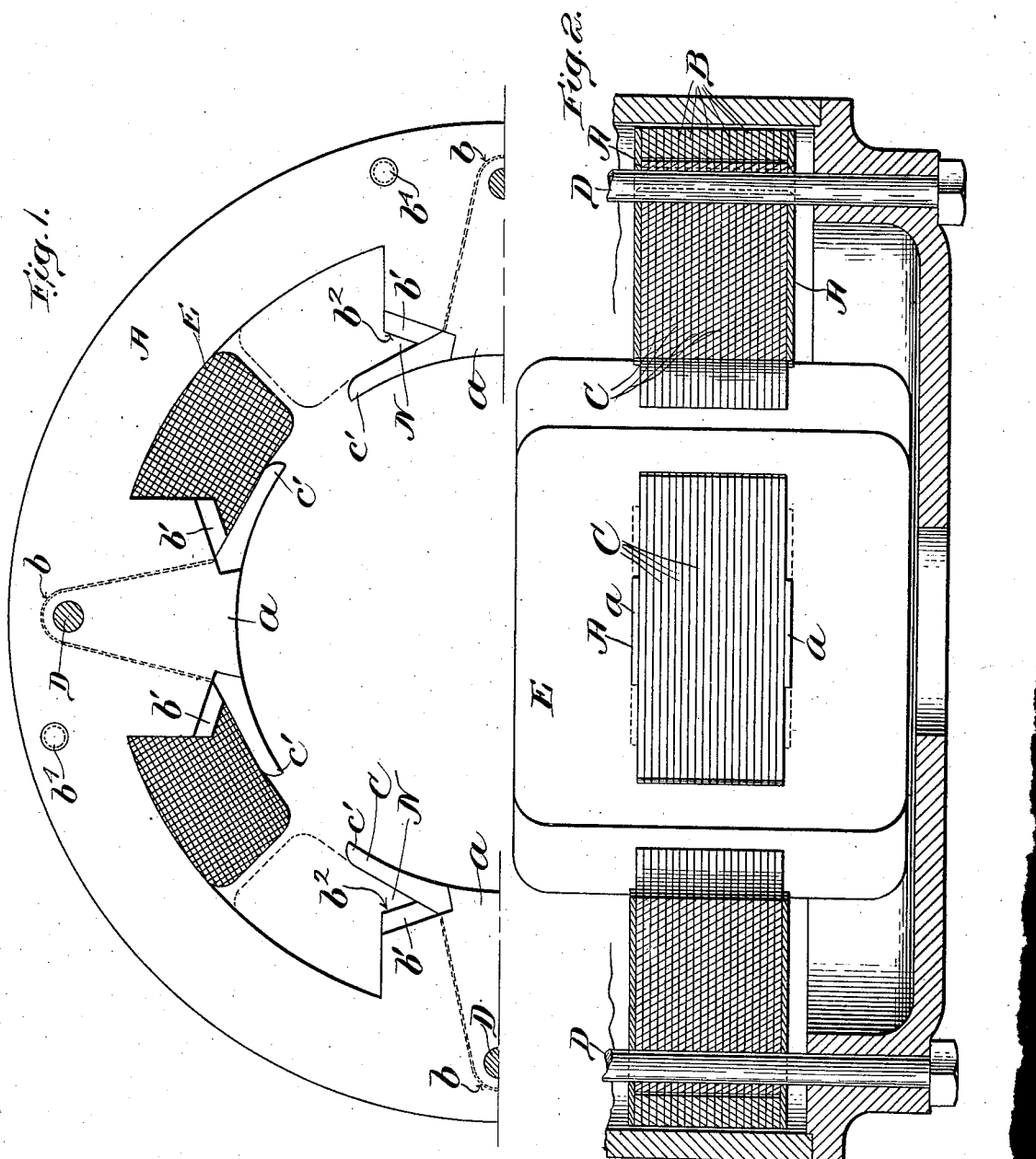
Witnesses:
Joseph T. Brennan
Margaret W. Danaher
Inventor:
Abe L. Cushman,
by Roberts & Mitchell
Attorneys.

No. 893,711. PATENTED JULY 21, 1908.
A. L. CUSHMAN.
FIELD MAGNET FOR DYNAMO ELECTRIC MACHINES.
APPLICATION FILED MAY 8, 1905.
3 SHEETS—SHEET 2.
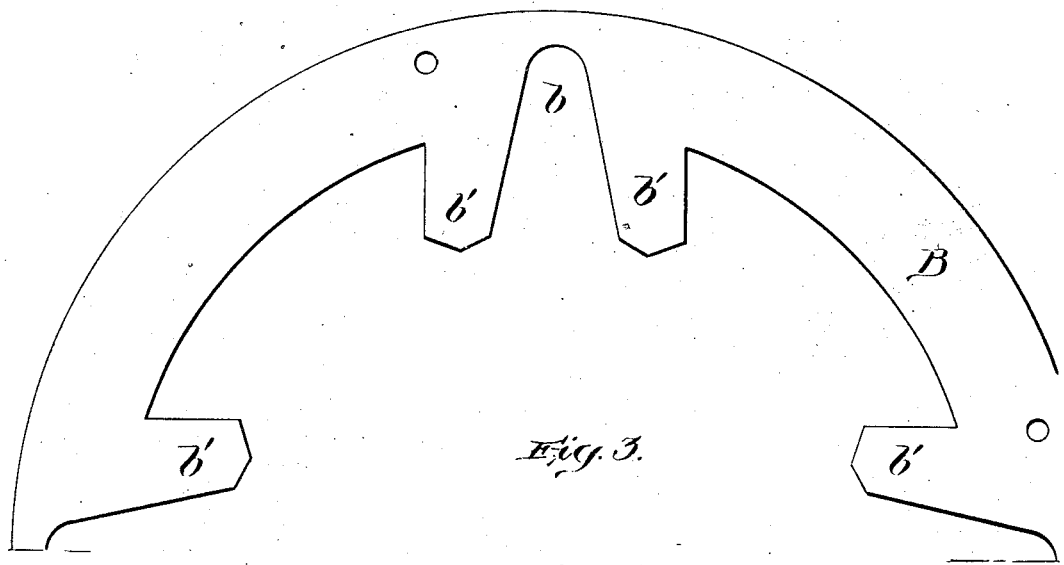
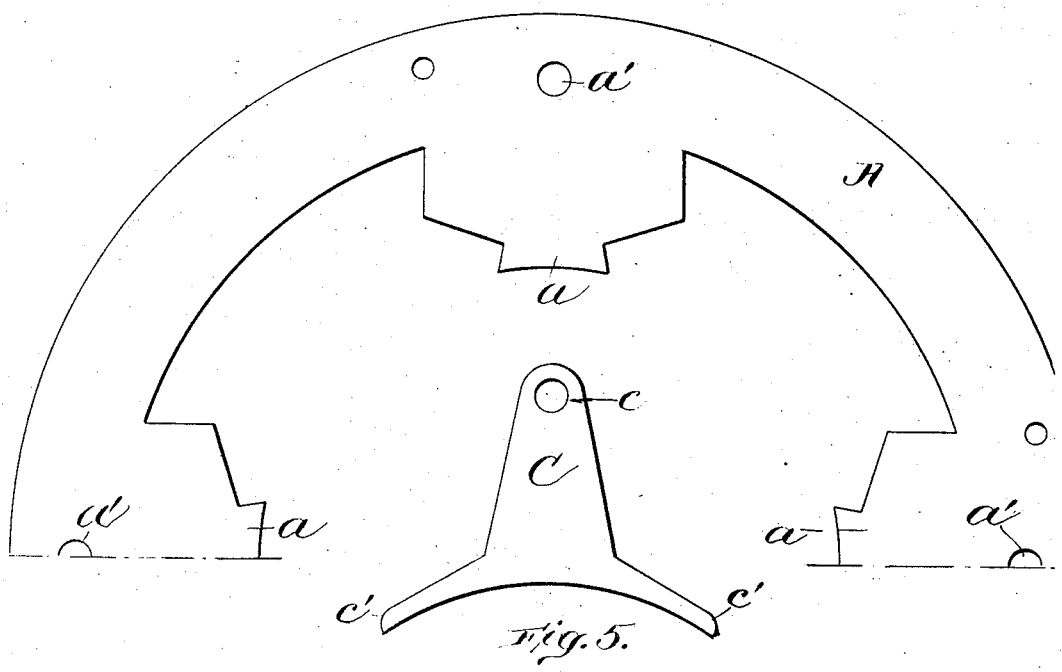
Witnesses:
Joseph T. Brennan
Margaret A. Danher
Inventor:
Abe L. Cushman,
by Roberts & Mitchell,
Attorneys.

No. 893,711.  PATENTED JULY 21, 1908.
A. L. CUSHMAN.
FIELD MAGNET FOR DYNAMO ELECTRIC MACHINES.
APPLICATION FILED MAY 8, 1905.

3 SHEETS—SHEET 3.

UNITED STATES PATENT OFFICE.

ABE L. CUSHMAN, OF CONCORD, NEW HAMPSHIRE.

FIELD-MAGNET FOR DYNAMO-ELECTRIC MACHINES.

No. 893,711.　　　Specification of Letters Patent.　　　Patented July 21, 1908.

Application filed May 8, 1905. Serial No. 259,293.

*To all whom it may concern:*

Be it known that I, ABE L. CUSHMAN, a citizen of the United States, and resident of Concord, in the county of Merrimack and State of New Hampshire, have invented new and useful Improvements in Field-Magnets for Dynamo-Electric Machines, of which the following is a specification.

My invention relates to field-magnets for dynamo-electric machines, and its object is to improve the construction of field cores and particularly field cores of laminated construction having removable pole tips whereby the field windings may be separately made and then readily slipped on or off the pole pieces.

My invention is especially though not exclusively adapted for use in connection with variable speed motors, in which the speed variation is effected by the weakening and strengthening of the fields. To establish the conditions productive of the best results, I have found that provision should be made for concentrating the lines of force near the pole tips to prevent distortion of the fields, and for effecting such concentration without reducing the capacity of the poles by reducing their full effective area; for insuring at the same time the gradual instead of the abrupt entrance of the armature wires into the field to prevent armature reaction and the necessity of shifting the brushes to secure sparkless commutation when the fields are weakened to speed up the motor; for securing the removable pole tips to the poles in such manner that all bolts or clamping devices, such as would cause eddy currents to flow in the pole tips, tending to heat the poles and to distort the fields, shall be removed from the pole tips and from the poles near the armature; for so locating the bolts or retaining devices for the removable pole tips, that they shall as little as possible cut the lines of force or afford electrical connections between the laminæ of the poles; and for arranging the cuts in the laminæ between the poles and the removable pole tips as nearly as practicable parallel with the lines of force to reduce the reluctance of the magnetic circuit to a minimum.

These and other objects presently to be pointed out are accomplished by a field core containing my invention, certain embodiments of which are shown in the accompanying drawings.

Figure 1 is a plan view of one half of a laminated field core illustrating my invention; Fig. 2 is a section through the middle of such field core; Fig. 3 is a plan view of one half of a ring forming one of the laminæ of which said structure is composed; Fig. 4 is a plan view of one-half of one of the outside or clamping rings; Fig. 5 is a plan view of one of the removable parts of the pole pieces; and Fig. 6 is a plan view of an alternative form of pole piece and removable pole tip.

Referring to the drawings, A, A represent the outer or clamping rings, and B, B the intermediate rings, which when assembled compose the laminated field core. Each ring B is made with projections $b'$, $b'$ arranged in pairs and extending radially inward, each pair constituting a polar projection having substantially parallel outer edges and a central longitudinal pocket $b$ extending beyond the base of the pole piece into the area of the magnetic yoke.

C, C represent T-shaped head plates, the stems or tongues of which fit into the pockets $b$ and the arms or heads of which constitute flaring pole tips $c'$, $c'$ when the parts are assembled as shown in Figs. 1 and 2. Each pair of projections $b'$ and the head plate C secured thereto, together form a complete pole piece. The lines of force may be concentrated at the center of the pole near its tip by cutting notches on either side; or the lines of force may be concentrated at the outer edges by cutting away a transverse part of the pole through the middle of the pole piece near its end. To provide lateral notches near the pole tips for the purpose of concentrating the lines of force, I bevel the outer corners of the projections $b'$, $b'$ as shown at $b^2$, $b^2$. Such beveled corners and the flaring pole tips $c'$, $c'$ form between them the notches N. Such notches register with each other in all the laminæ and provide a cut-away part through the whole width of the pole piece. The outer or clamping rings A also have polar projections $a$ which register with the polar projections of the rings B when the laminæ are assembled, and thus close the sides of the space formed by the pockets $b$ and afford fixed holding means for the bolt D presently to be described. The polar projections $a$ are solid instead of separable and no flaring or extending pole tips are used such as would prevent the field coils from being slipped ready-made on or off the poles. Each removable polar piece or head plate C is made with a hole $c$ near the base or end of the tongue, and the rings A are made with holes $a'$ which register with holes $c$.

D is a rod or bolt passing through the holes $c$ and $a'$ holding the head plates C in position, and holding or assisting to hold all the laminæ together.

Instead of the lateral notches N, a transverse part of the pole pieces may be cut away through the pole pieces, which will concentrate the lines of force at the outer edges of the poles instead of at the center. The construction shown in Fig. 6 may then be used. The head plate C' is provided with an aperture at or near the junction of the stem and head, preferably in the form of a diamond or trapezium as shown at $c^2$. The end of the projections $b^3$ in such construction are not notched but extend straight to the flaring pole tips. The structure is otherwise the same as shown in the other figures.

In building the field magnet a group of rings B are laid together, a sufficient number being used to make the field-core of the required thickness, a clamping ring A is placed on either side, and the whole structure is then fastened together by pins or bolts $b^4$ near the outer periphery of the rings. The field coils E which may have been previously wound are then slipped over the polar projections and the head plates placed in position in the pockets where they are held by the pins or bolts D. If desired more than one clamping ring A may be used on either side of the core, and one or more such rings may be interspersed among the group of intermediate rings B to stiffen the pin or bolt D and render the whole laminated structure more strong and rigid.

I am aware that removable pole tips have heretofore been proposed to admit of placing the field coils ready wound upon the pole pieces, and I do not claim that idea broadly. But from the foregoing description it will be seen that an important feature of my invention is the absence of all bolts or clamping devices from the pole tips or the poles near the pole tips, and in the immediate vicinity of the armature. The presence of such clamping devices located at the pole tips and electrically connecting the laminæ of the pole pieces, which construction, so far as I am aware has always existed in the structures hitherto devised, has not only caused eddy currents to flow in the pole tips, thereby heating the poles and to a certain extent distorting the fields at the leading pole tips when the poles are weakened to vary the speed of the motor, but has also cut the lines of force and so increased the reluctance of the magnetic circuit. These difficulties are avoided by my invention in which the bolts for holding the separable pole tips are located near the periphery of the magnetic yoke back of the bases of the pole pieces and outside of the area of the field windings. The bolts are also located centrally with respect to the pole pieces so that the lines of force generated within the poles pass either side of the several bolts which prevents them from cutting the lines of force.

I am also aware that pole pieces tapering from the yoke to the pole tips have been used which results in concentrating the lines of force at the pole tips. The capacity or effective area of such poles however is equivalent only to the cross sectional area midway between the magnetic yoke and the pole tips; while in my device, by cutting away part of the pole near the pole tip for this purpose, either by providing lateral notches or a central aperture, the body of the pole piece being of substantially uniform capacity excepting across the cut-away part lines of force equivalent to the entire area of the pole piece are available. Furthermore the constricted part of my poles, namely the notched or cut-away part, is not at the extreme end of the pole piece, but near the pole tip, so that a flaring or extending pole tip may be used. This is of the greatest importance when used in connection with a variable speed motor, whose speed variations are controlled by varying the density of the fields. When the field is weakened to increase the speed of the motor the lines of force tend to crowd over near the leading pole rendering the same relatively dense and leaving the other side of the pole tip relatively weak. Under such conditions if the armature enters the magnetic field abruptly sparking occurs at the brushes.

To secure sparkless commutation at the brushes, the brushes would have to be shifted,—obviously an impracticable expedient in a variable speed motor. This objection is overcome by my device which provides flaring pole tips immediately in front of the notches and insures the gradual rather than the abrupt entrance of the armature wires into the magnetic field. My improved field core therefore provides a pole piece in which the entire area of its pole is available to generate lines of force; in which at the same time the lines of force may be concentrated near the pole tip; and in which at the same time the abrupt entrance of the armature coils into the magnetic field is avoided. It will also be observed that an entire central section of the pole piece in my device is removable from the magnetic yoke through the pole together with the flaring pole tip. The cut in the laminæ is therefore nearly parallel with the lines of force generated in the pole and the reluctance of the magnetic circuit is reduced to a minimum; such construction also admits of placing the securing means for the removable tips back of the pole winding the advantages of which have already been pointed out, and also causes the removable section to be directly magnetized by the field winding.

I claim:

1. A field magnet for dynamo-electric machines, having pole pieces provided with removable flaring pole tips, the ends of the pole pieces and the flaring pole tips being so formed as to provide substantially V-shaped lateral notches therebetween to concentrate the lines of force.

2. A field magnet for dynamo-electric machines, having pole pieces provided with removable flaring pole tips, the ends of the pole pieces and the flaring pole tips being so formed as to provide substantially V-shaped lateral notches therebetween to concentrate the lines of force, said pole pieces being of substantially uniform cross sectional area from their yokes to said notches.

3. In a field magnet for dynamo-electric machines a plurality of laminæ forming laminated pole pieces, and removable flaring laminated pole tips, the ends of the several laminæ of the pole pieces and the several laminæ of the flaring pole tips being so formed as to provide substantially V-shaped notches therebetween.

4. In a field magnet for dynamo-electric machines, a plurality of laminæ forming laminated pole pieces, and removable flaring laminated pole tips, the ends of the several laminæ of the pole pieces and the several laminæ of the flaring pole tips being so formed as to provide substantially V-shaped notches therebetween, and the laminæ of said pole pieces being of substantially uniform width from their yokes to said notches.

5. In a field-magnet for dynamo-electric machines, a plurality of laminæ comprising pole pieces and removable pole tips, and means located outside of and back of the area of the pole windings for securing the pole tips to the pole pieces.

6. In a field-magnet for dynamo-electric machines, a plurality of laminæ having pole pieces provided with removable flaring pole tips and lateral notches immediately behind the flaring pole tips, and means located outside of and back of the area of the pole windings for securing the pole tips to the pole pieces.

7. In a field-magnet for dynamo-electric machines, a plurality of laminæ having pole pieces, removable flaring pole tips made with projections or tongues extending backward beyond the bases of the pole pieces, and bolts located outside of and behind the area of the pole windings passing through said tongues for securing the pole tips to the pole pieces.

8. In a field-magnet for dynamo-electric machines, a plurality of laminæ having pole pieces, removable flaring pole tips made with projections or tongues extending backward beyond the bases of the pole pieces, and bolts located outside of and behind the area of the pole windings passing through said tongues for securing the pole tips to the pole pieces, the pole pieces being notched near their ends behind the flaring pole tips.

9. In a field-magnet for dynamo-electric machines, a plurality of laminated pole pieces, a central section of the several laminæ being removable and made with flaring pole tips, and bolts passing through the bases of said removable parts at points removed from the pole tips for securing said removable parts to the pole pieces said bolts being located in the line of the longitudinal central axis of the poles.

10. In a field-magnet for dynamo-electric machines, a plurality of laminated pole pieces made with longitudinal pockets, T-shaped head plates removably secured to said pole pieces, the stems or tongues of which fit into said pockets forming parts of the poles, and the arms of which form flaring pole tips, and bolts passing through the bases of said stems or tongues at points remote from the pole tips for securing said head plates in position said bolts being located in the line of the longitudinal central axis of the poles.

11. In a field-magnet for dynamo-electric machines, a plurality of laminated pole pieces made with laterally beveled outer corners and central longitudinal pockets, and T-shaped head plates removably secured to said pole pieces the stems or tongues of which fit into said pockets and the arms of which constitute flaring pole tips, said beveled corners and flaring pole tips forming notches between them to concentrate the lines of force.

12. A laminated field-magnet structure for dynamo-electric machines, comprising a plurality of intermediate rings, polar projections upon said rings made with central longitudinal pockets, and laterally beveled corners, T-shaped head plates the tongues or stems of which fit into said pockets, and the arms of which constitute flaring pole tips and form with said beveled corners notches near the pole tips, outer clamping rings having solid polar projections registering with the polar projections of the intermediate rings, and bolts passing through said clamping rings and the tongues of the head plates to hold the whole structure together.

Signed by me at Concord N. H. this twenty seventh day of April 1905.

ABE L. CUSHMAN.

Witnesses:
VERA I. CATON,
ROBERT CUSHMAN.